United States Patent [19]
Groeger et al.

[11] Patent Number: 5,674,339
[45] Date of Patent: Oct. 7, 1997

[54] PROCESS FOR FIBROUS STRUCTURE CONTAINING IMMOBILIZED PARTICULATE MATTER

[75] Inventors: Herbert Gunter Groeger; George Allibone Serad; Clinton Dale Fenton, all of Charlotte, N.C.

[73] Assignee: Hoechst Celanese Corporation, Somerville, N.J.

[21] Appl. No.: 284,867

[22] Filed: Aug. 2, 1994

Related U.S. Application Data

[62] Division of Ser. No. 977,995, Nov. 18, 1992, abandoned.

[51] Int. Cl.[6] .................................................. A63B 39/00
[52] U.S. Cl. ................ 156/145; 156/62.2; 156/62.6; 156/82; 156/272.2; 156/276; 156/283; 428/323; 428/283; 428/333; 428/357
[58] Field of Search .................... 156/62.6, 279, 156/276, 62.2, 272.2, 283, 82, 337, 145; 428/323, 283, 337, 157, 195, 332, 903, 333, 357

[56] References Cited

U.S. PATENT DOCUMENTS

| | | | |
|---|---|---|---|
| 2,958,593 | 11/1960 | Howard et al. | 51/295 |
| 3,971,373 | 7/1976 | Braun | 128/146.2 |
| 3,981,100 | 9/1976 | Weaver et al. | 47/58 |
| 3,998,988 | 12/1976 | Shimomai et al. | 428/400 |
| 4,011,067 | 3/1977 | Carey, Jr. | 55/354 |
| 4,103,062 | 7/1978 | Aberson et al. | 428/283 |
| 4,105,033 | 8/1978 | Chatterjee et al. | 128/285 |
| 4,160,059 | 7/1979 | Semejima | 428/288 |
| 4,235,237 | 11/1980 | Mesek et al. | 128/284 |
| 4,429,001 | 1/1984 | Kolpin et al. | 428/283 |
| 4,547,420 | 10/1985 | Krueger et al. | |
| 4,681,801 | 7/1987 | Eian et al. | |
| 4,868,032 | 9/1989 | Eian et al. | |
| 4,872,220 | 10/1989 | Haruvy et al. | |
| 4,904,343 | 2/1990 | Giglia et al. | |
| 4,970,111 | 11/1990 | Smith, Jr. | |
| 4,983,192 | 1/1991 | von Blucher et al. | |
| 5,077,116 | 12/1991 | Lefkowitz | |
| 5,082,720 | 1/1992 | Hayes | |
| 5,328,758 | 7/1994 | Markell et al. | |

FOREIGN PATENT DOCUMENTS 275047  7/1988  European Pat. Off. .

*Primary Examiner*—Merrick Dixon
*Attorney, Agent, or Firm*—Timothy R. Kroboth

[57] ABSTRACT

Fibrous structures containing immobilized particulate matter and processes for making them are disclosed. These structures may be used for filters and for fabrics including chemical defense garments and others. The fibrous structures have webs containing composite fibers having a lower melting component and a higher melting component. The particles are distributed into the interior of the web and fused to the low melting component of the individual fibers without substantially reducing the available surface area of the particle. A fibrous structure of a composite staple having a nylon sheath and a polyester core, with activated carbon particles bonded to the sheath is specifically disclosed. The processes for producing such a fibrous structure include carding a web of staple fibers and distributing particulate matter therein, air laying a web of staple fibers and distributing particulate matter therein, spin bonding a web of continuous filaments and distributing particulate matter therein, and wet forming a web of staple fibers and particulate from a suspension thereof between two wet formed layers of staple fibers. One or more additional layers of nonwoven, woven, or knit webs or fabrics may be bonded thereto.

14 Claims, 4 Drawing Sheets

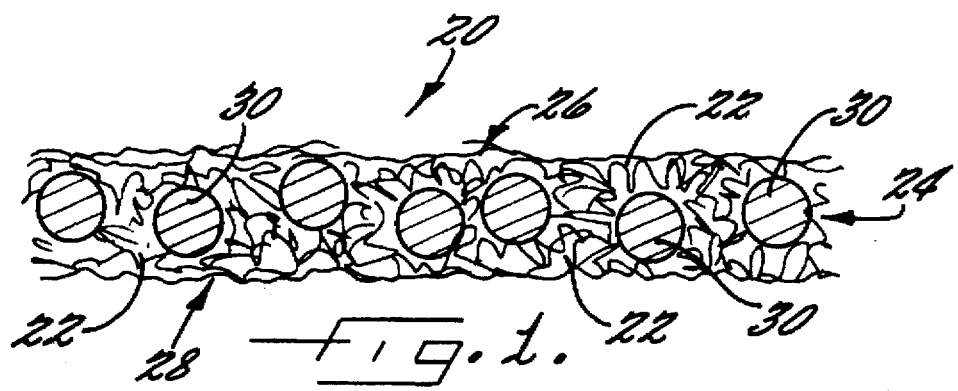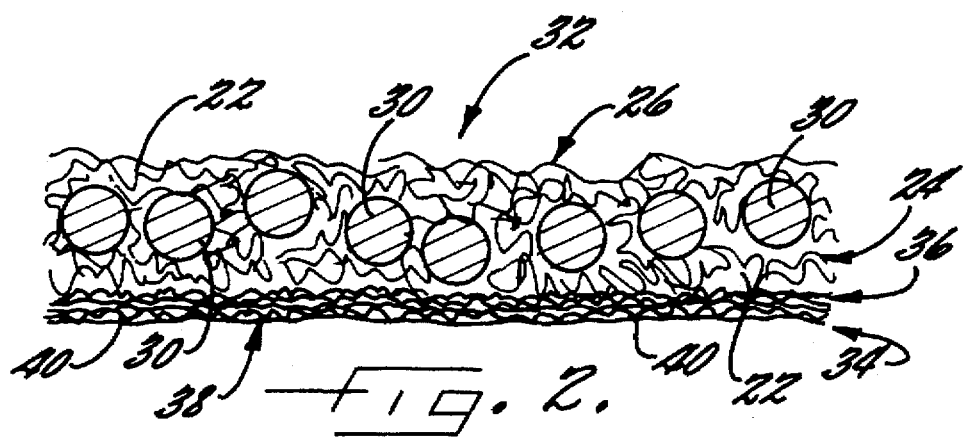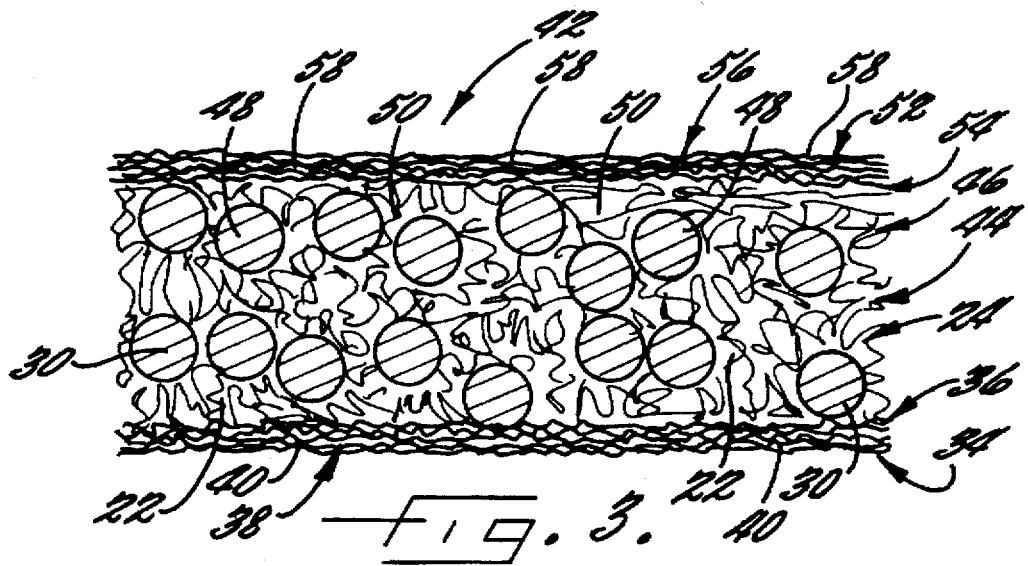

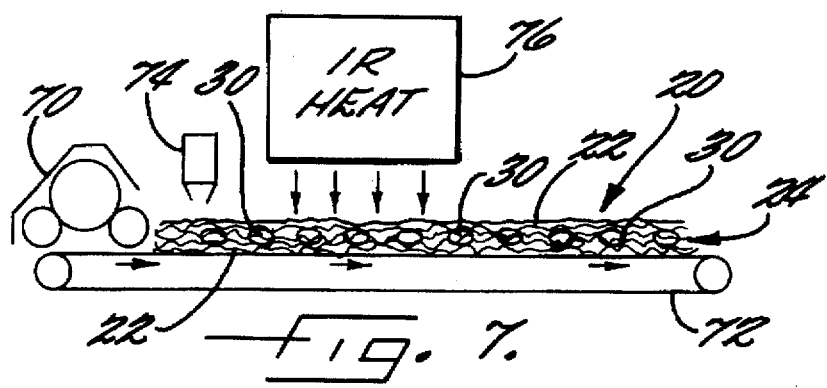
FIG. 7.
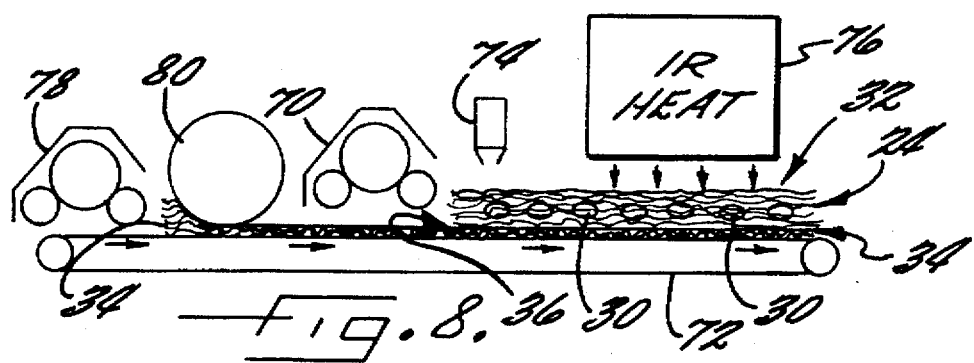
FIG. 8.
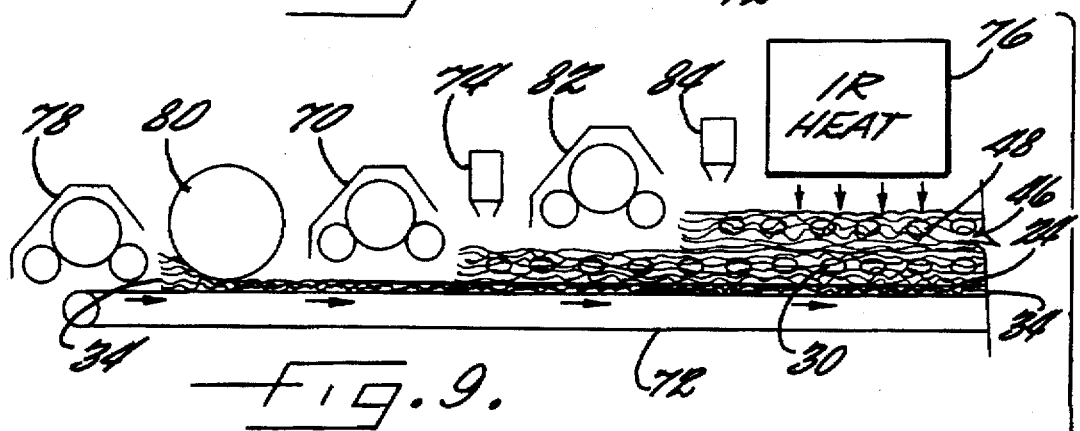
FIG. 9.
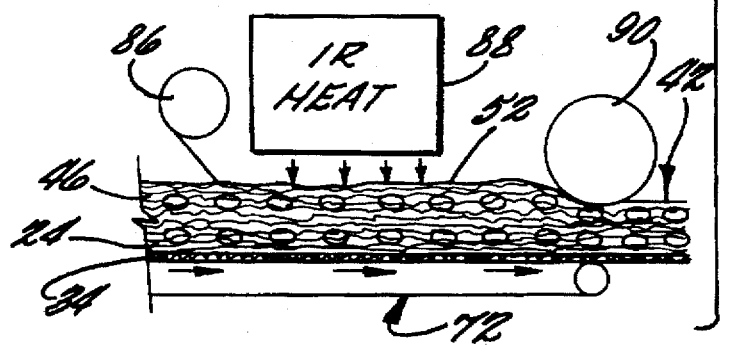

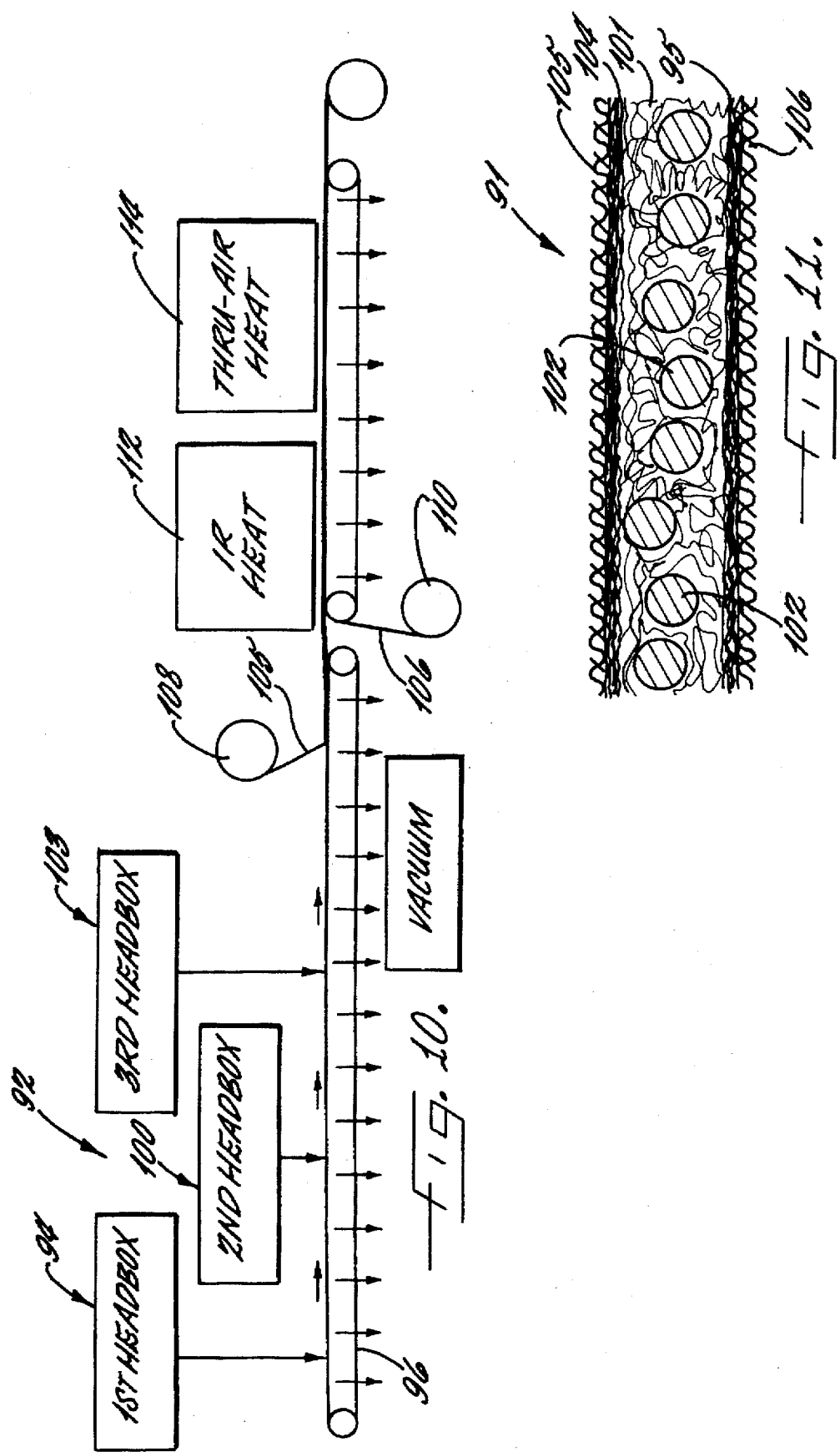

PROCESS FOR FIBROUS STRUCTURE CONTAINING IMMOBILIZED PARTICULATE MATTER

This is a divisional of application Ser. No. 07/977,995 filed Nov. 18, 1992 abandoned Feb. 16, 1995.

FIELD OF THE INVENTION

The invention claimed herein relates to a fibrous structure having particulate matter contained therein. In particular, this invention relates to particulate containing filters and to chemical defense fabrics and other fibrous structures containing particulate matter.

BACKGROUND OF THE INVENTION

Particulate matter may be incorporated into a fibrous structure for a variety of reasons. For example, chemical defense fabrics for garments for military personnel may contain vapor sorptive particles such as activated carbon. These garments typically are designed to remove poisonous gases from the air. Filters may include sorptive particles selectively to remove certain components of a liquid or gas passing through the filter. Abrasive particles may be used to create an abrasive fabric. Particulate matter may also be used in a fibrous structure to release an active agent into a fluid stream.

Eian et al. U.S. Pat. No. 4,868,032 discloses chemical protective garments. Reinforcing bi-component fibers are needled into a meltblown web of polymer fibers onto which solid particulate matter has been dispersed. Heat is applied to bond the needled fibers to the meltblown on both sides of the fabric.

Haruvy et al. U.S. Pat. No. 4,872,220 discloses a protective clothing comprising a laminate of three layers in which one of the layers may contain an adsorptive particulate.

Giglia et al. U.S. Pat. No. 4,904,343 relates to a toxic vapor adsorptive nonwoven fabric in which activated carbon fibers and activated carbon particles may be incorporated into a web of fibrillated acrylic fiber. The fabric is prepared by the wet forming process. A slurry of the particles and fibers is deposited onto a forming belt to form a particulate containing web that may be laminated to other fabrics.

As noted above, particulate containing structures typically are laminated to other fabric layers to produce garments. One problem that has been encountered is that garments that contain particulate matter typically do not last for a suitable period of time. Washing and other stresses can result in delamination of the fabric layers, loss of particulate matter, and deterioration of the garment. The particulate matter often is adhered to the surfaces of the particulate containing structure that is laminated to various fabrics to form the garment. The particles interfere with bonding between fabric layers, whether bonding is accomplished by heat, pressure, adhesives, or some combination of these methods. Also, the particles are subject to abrasive removal, which reduces the effectiveness of the garment.

Filters containing particulate matter typically are not laminated to fabric layers, it being desirable to avoid restricting flow of liquids or gases through the filter so as not to increase pressure drop across the filter. For example, Shimomai et al. U.S. Pat. No. 3,998,988 discloses that filters may be prepared from finely divided adsorbent particles such as activated carbon adhered to a conjugate fiber of thermoplastic polymer composed of a higher melting component and a lower melting component. Fiber having a polyethylene core and a polystyrene sheath is specifically disclosed. The fiber is heated to bond the particles to the surface of the fiber without substantially adhering the fibers to one another. The fibers may be in the form of a nonwoven web of filaments or staple fibers, or a knit, woven, or nonwoven fabric having particulate matter adhered to the surface thereof. U.S. Pat. No. 3,998,988 does not recognize the problem of producing structures having particulate matter on the surfaces thereof and proposes no solution to the problem of having particulate matter on the surface of a web or fabric.

It would be desirable to produce open fibrous structures in which particulate matter may be immobilized within the fibrous structure between the surfaces thereof and does not interfere with bonding to other fibrous structures. It would also be desirable to produce a fibrous structure containing particulate matter that substantially is not subject to abrasion or abrasive removal of the particulate matter. Such open fibrous structures could be useful for filters and for laminating to fabrics for making garments or to other fibrous structures that do not as readily delaminate as prior garments or other structures.

SUMMARY OF THE INVENTION

The invention claimed herein relates to a fibrous structure comprising a nonwoven web of manufactured fibers. Particulate matter is immobilized within the web without substantially extending into the upper and lower surfaces of the web.

The manufactured fibers may include thermoplastic manufactured fibers that can be thermally bonded to entrap the particulate matter within the web structure and to which the particulate matter can be fused. The thermally bonded web structure substantially limits migration of particulate matter within the structure or abrasive loss of particles from the structure. Composite thermoplastic fibers in which one component has a relatively lower melting point and the other component has a relatively higher melting point may be used. The fibers are thermally bonded at the cross over points. The higher melting component provides strength to the fibrous structure while the particulate matter may be fused to the low melting component of the composite fiber.

In a specific embodiment, the fibrous structure comprises sheath-core composite fibers in which the sheath is a lower melting nylon and the core is a higher melting polyester. Activated carbon particles are entrapped within the thermally bonded fibrous structure without extending substantially into the surfaces of the structure and are fused to the nylon sheath component of the sheath-core composite fiber. The nylon sheath bonds the individual fibers at the cross over points.

In alternative specific embodiments, the nonwoven fibrous structure is a core structure and may have laminated thereto one or more fabric layers. These fabric layers may be nonwovens, woven fabrics, or knit fabrics. The core may include on one or both sides thereof partially densified nonwoven webs of composite fibers that are bonded to the core through the application of heat, or pressure, or a combination of both. This fibrous structure is also suitable for lamination with various fabric components or may be used as a filter.

The invention also relates to a process for producing the fibrous structure. The process comprises the steps of forming an open fibrous web of manufactured fibers that have particulate matter distributed within the web between the surfaces of the web without substantially extending into the web surface, immobilizing the particulate matter within the interior of the web, and thermally bonding the web. The web may be formed by forming a carded web and distributing particulate matter therein; air forming a web and distributing particulate matter therein; wet forming a web having particulate matter distributed therein between two additional wet formed layers; or spinning of continuous filaments, forming an open web therefrom, and distributing particulate matter therein; or other methods in which a suitably open web receives particulate matter and entraps a particulate matter within the structure of the web. The particulate matter is immobilized within the web by applying heat to fuse the particulate matter to the fiber and to thermally bond the web.

In one specific embodiment, the particles are heated to a point above the melting point of the low melting component of the composite fiber and then distributed into the interior of the web where the heated particle causes localized meniscus bonding with the fibers. Thereafter, the web is thermally bonded.

In a still more specific embodiment, the open web containing the particulate matter is dry formed on a partially bonded web prior to dispersion of particulate matter into the open web. Thereafter heat is applied to fuse the particulate matter to the fibers of the open web, to thermally bond the web, and to bond the partially bonded web to the open web.

BRIEF DESCRIPTION OF THE DRAWINGS

FIG. 1 represents a fibrous structure comprising an open web of composite thermoplastic manufactured fibers having particulate matter immobilized therewithin in accordance with the invention.

FIG. 2 represents the fibrous structure of FIG. 1 having bonded thereto a partially densified web of manufactured fibers.

FIG. 3 represents the fibrous structure of FIG. 2 having bonded thereto opposite the partially densified web an additional open web of composite thermoplastic manufactured fibers with particulate matter immobilized therewithin and a partially densified web of manufactured fibers.

FIG. 7 represents a specific embodiment for the manufacture of the fibrous structure of FIG. 1.

FIG. 8 represents a specific embodiment for the manufacture of the fibrous structure of FIG. 2.

FIG. 9 represents a specific embodiment for the manufacture of the fibrous structure of FIG. 3.

FIG. 10 is a highly schematic representation of a wet forming method for preparing a fibrous structure in accordance with the invention.

FIG. 11 represents in longitudinal section a fibrous structure made by the wet forming method of FIG. 10.

Corresponding reference characters indicate corresponding components throughout the several views of the drawings.

DETAILED DESCRIPTION OF THE PREFERRED EMBODIMENTS

Figure 4:
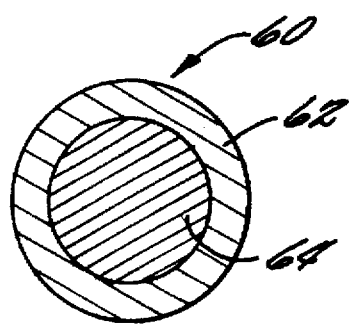
FIG. 4 represents a cross section through a composite thermoplastic manufactured fiber as used to form the fibrous structure of the invention.

FIG. 1 shows at 20 a greatly enlarged representation of a sectional view through the open fibrous structure of the invention. The fibrous structure comprises a plurality of individual thermoplastic composite manufactured fibers 22, the structure and composition of which are discussed in greater detail hereinbelow, which form an open web 24 and define an upper surface 26 and a lower surface 28 for the web. Particulate matter, represented at 30, is shown distributed throughout the web without substantially extending into the upper and lower surfaces of the web. The web 24 is sufficiently open so that particles 30 are distributed within the web between the surfaces 26 and 28. The web 24 is thermally bonded at the cross over points of the individual fibers 22, entrapping the particles so as substantially to preclude their migration out of the web (as illustrated greatly enlarged in FIG. 6). The particles 30 are fused to the individual fibers to secure the particles without substantially affecting the surface area of the particle available for adsorption (as illustrated greatly enlarged in FIG. 5).

FIG. 2 shows at 32 a greatly enlarged representation of a sectional view of the fibrous structure of FIG. 1 bonded to a partially densified web 34 at the interface 36 of the surfaces of the webs. Former surface 28 of web 24 is now bonded to web 34. Partially densified web 34 defines a lower surface 38 opposite interface 36. The partially densified web comprises composite thermoplastic manufactured fibers 40 that may be the same or different as the manufactured fibers 22, as explained further hereinbelow. Because it is partially densified, web 34 is not flattened and has fibers extending above its surface so that the fibers 22 and 40 intermingle to a degree that upon bonding, by application of heat or pressure, or both, webs 24 and 34 form a unitary structure 32 that substantially precludes delamination at interface 36.

FIG. 3 shows at 42 a greatly enlarged representation of a sectional view of the fibrous structure of FIG. 2 having bonded thereto at interface 44 an open fibrous web 46 that contains particulate matter 48. Fibrous web 46 comprises composite thermoplastic manufactured fibers 50 that may be the same or different as the fibers 22 of web 24. Particulate matter 48 is entrapped within web 46 and fused to the individual fibers 50 in the same manner as with respect to web 24. Particulate matter 48 may be the same or different as particulate matter 30 of web 24.

Also referring to FIG. 3, a partially densified web 52 is bonded to web 46 at interface 54 opposite interface 44. Partially densified web 52 defines an upper surface 56 opposite interface 54. The partially densified web comprises composite thermoplastic manufactured fibers 58 that may be the same or different as the manufactured fibers 50, 40, or 22, as explained further hereinbelow. Because it is partially densified, the surface of web 52 is not flattened and has fibers extending above the surface so that the fibers 50 and 58 are intermingled. Also, fibers 22 and 50 are intermingled at interface 44, and fibers 40 and 22 are intermingled at interface 36. Upon bonding of structure 42, by application of heat or pressure, or both, webs 34, 24, 46, and 52 form a unitary structure 42 that substantially precludes delamination at interfaces 36, 44, and 54.

Turning now to FIG. 4 for a more detailed discussion of the composite thermoplastic manufactured fibers represented in FIGS. 1 through 3, FIG. 4 is a representation of a cross section through a composite thermoplastic manufactured fiber 60. Fiber 60 is illustrative of the many types of composite manufactured fibers that may be used in webs 52, 46, 24, and 34 of FIGS. 1, 2, and 3 and may comprise fibers 22, 40, 50, and 58. Composite manufactured fiber 60 is illustrated as a concentric sheath-core fiber in which the sheath and the core each comprise about 50% of the cross sectional area of the fiber. The fiber has a lower melting sheath 62 and a higher melting core 64. The sheath should have a melting point that is at least about 20° C. below the melting point of the core and should occupy about half the cross section of the fiber to provide strong thermal bonding of the fibrous structure and of particulate matter to individual fibers without adversely affecting the integrity of the core. The core provides strength and integrity to the open fibrous structure. A range area of the fiber occupied by the sheath is contemplated to be from about 40% to about 60%. For example, in a preferred embodiment, the sheath may comprise a nylon that has a melting point of from about 175° to about 185° C. The core may comprise a polyester having a melting point of form about 240° to 256° C.

Concentric sheath-core fibers are one example of the composite thermoplastic manufactured fibers that can be used in the practice of the invention claimed herein. Suitable fibers include eccentric sheath-core fibers in which the center of the core does not coincide with the center of the fiber and side-by-side fibers in which two components, one higher melting and one lower melting, are simultaneously extruded through a single orifice to form a fiber having two halves. Composite fibers of these types are also referred to as hi-component fibers or heterofil fibers.

The fibrous structures of the invention all include composite manufactured fibers as described above, having a lower melting component for thermal bonding of the structure and for fusing of particles to individual fibers. The skilled artisan will recognize that there are a wide variety of composite fibers having a higher melting component and a lower melting component that are suitable for the practice of the invention and that a nylon sheath and polyester core fiber is but one of the vast array of fibers available.

The composite fibers may be in a wide variety of forms including crimped and non-crimped cut staple fibers, short-cut staple, continuous filaments, or blends thereof. The composite fibers should be present in an amount sufficient to provide adequate bonding to individual particles and to form a structure that may be thermally bonded to entrap the particles. Additionally, the webs may include with the composite manufactured fibers, non-composite manufactured fibers, filament or staple, or other substances such as cellulose acetate fibrets. The fibrous structure of the invention may include from about 10% to about 80% by weight of non-composite fibers.

The composite fibers contemplated for use in the practice of the present invention include structural fibers having a denier per filament of from 1 to 15 to provide sufficient structure for entrapping particulate matter and for bonding thereto. A fabric structure including such structural fibers will also include microdenier fibers of from 0.1 to 1 denier per filament to provide softness for comfort in a garment. These microdenier fibers may be composite or non-composite manufactured fibers or a blend thereof. Fiber structures intended for use as filters will need to include, in addition to the structural fibers of from 1 to 15 denier per filament, structural fibers having a denier per filament of from 6 to 10,000 to provide stiffness, especially if a large particulate is used. Structural fibers of a denier per filament of from 6 to 10,000 to support relatively large particulate matter may be selected from composite fibers, non-composite fibers, and blends thereof. These fiber structures that are used for filters can be built to thicknesses of from ½ to 2 inches or more.

Figure 5:
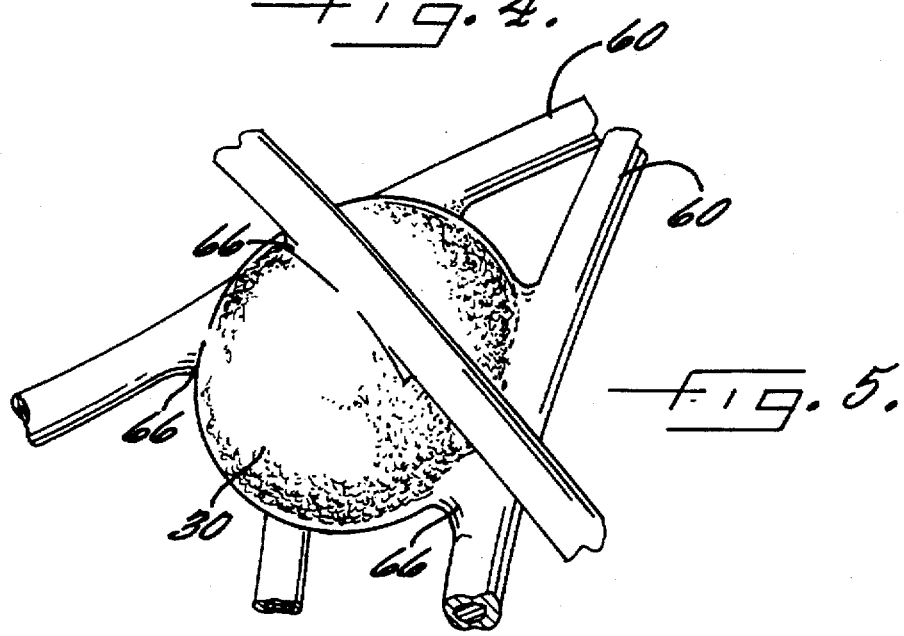
FIG. 5 represents a particle entrapped within a portion of a fibrous structure and fusion bonding of the particle to the individual fibers.

Turning now to a discussion of entrapping the particulate matter within the fibrous structure and fusing the particulate matter to the individual fibers, FIG. 5 represents a single particle entrapped within a plurality of fibers 60. The fibers 60 are fused to the particle 30 at numerous points 66. Fusing of the particle to the fiber is localized in that the low melting component of a composite fiber does not form a film over the particle or otherwise substantially reduce the surface area of the particle available for contact with a liquid or gas stream moving through the fibrous structure.

Particulate matter 30 may be selected from a wide variety of substances having some function that is desirably incorporated into a fibrous structure. One of the most common is activated carbon adsorbent. Activated carbon beads may be fused to the individual fibers of the fibrous structure of the invention by heating the particles above the melting point of the low melting component of the composite thermoplastic fiber and dispersing the particles into the web or by heating the web after the particles have been dispersed therein. Activated carbon particles, and other inorganic oxides and hydrates have significantly lower specific heats than polymers and so heat quickly and result in localized fluidity of the low melting polymer component. A "spot weld" is produced with a thin, controlled layer of adhesive provided by the low melting polymer that minimizes loss of surface area of the particle.

Other types of functional particulate matter include silica, zeolite, molecular sieve, clay, alumina, ion exchange resin, organic metal catalyst, metal oxide, biocide, fungicide, and virucide. For example, a fungicidal particulate matter may be incorporated into a filter structure, such as for an automobile climate control system, to remove mildew and mildew odors from the circulated air. Biocides and virucides may be incorporated into chemical defense fabrics for protection against biological warfare. Particulate sizes may range from a small size of 1 micron for biocides and fungicides for garments and some filters to 3 to 5 mm. for other filters, and vary in shape from spheroidal beads to cylinders up to about 6 mm. in length. Activated carbon beads typically are of about 400 microns in size. The foregoing list is intended to be representative of the wide variety of functional particulate matter available, and not in limitation of the substances suitable for use in the practice of the present invention.

Figure 6:
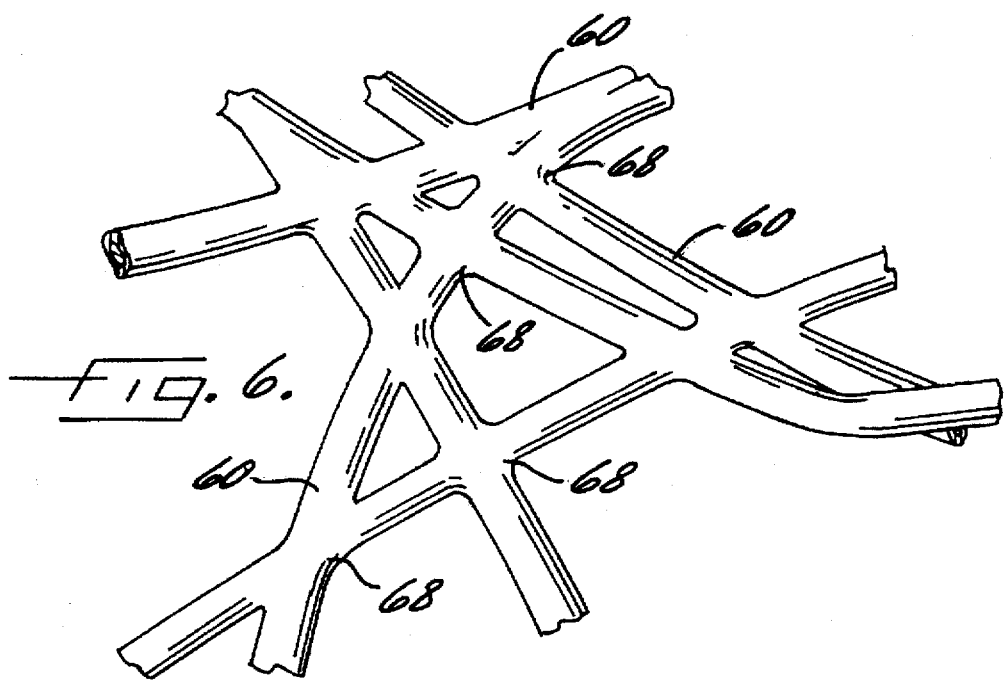
FIG. 6 represents thermal bonding of the fibrous structure of the present invention within which particulate matter is entrapped.

Turning now to a discussion of the thermally bonded fibrous structure of the invention for entrapping the particulate matter within the structure of the web, FIG. 6 represents the thermally bonded web of the present invention and shows a portion of the composite manufactured fibers 60 in greatly exaggerated size being bonded at the cross over points 68. These bonds 68 provided by composite fibers are generally stronger than the composite fibers themselves. As can be seen from FIG. 6, the thermally bonded web forms a cage like structure in which particulate matter may be entrapped and substantially precluded from migrating in the web. The particulate matter is dispersed into the structure of the web and then heat is applied to thermally bond the web.

Turning now to a discussion of the various processes by which the fibrous structures of the present invention can be manufactured, FIG. 7 represents in highly schematic form the formation of a fibrous structure 20 as represented in FIG. 1 from a single web of fibers 24 having particulate matter 30 distributed therein. Specifically, a carding machine 70 cards composite thermoplastic staple fibers 22, such as fiber 60 shown in FIG. 4 having a lower melting nylon sheath and a higher melting polyester core and forms a web 24 onto an endless moving belt 72. For carding, the fibers typically will have been crimped. Particulate matter 30, such as activated carbon beads, are applied from a shaker 74 located adjacent the carding machine. The web is opened to a sufficient degree and the beads are of a sufficient size and weight to become entrapped in the interior of the web rather than remaining on top of the web. The carbon beads may be heated and applied to the web for localized meniscus bonding with the sheath of the composite fibers. Alternatively, heat may be applied, preferably infrared heat, from a heater 76 to melt the sheath and cause the carbon particles to become adhered and immobilized within the web. Using infrared heat, the initial application of heat to the web is without pressure. Heat from heater 76 also serves to thermally bond the fiber structure to entrap the particles in the web, as is illustrated in FIGS. 5 and 6. If desired, fibrous structure 24 may be further bonded by the application of pressure by running structure 24 through a calender nip (not shown).

Particulate matter may be applied from one or more scatter coaters, engraved rolls, or screen conveyors. An inclined ramp may be used to spread the particulate and to enmesh the particulate within the web. The concentration of particulate can be controlled by adjusting the ramp angle. The particulate may be heated or cold. The particulate may be added in one or more layers to improve uniformity, increase bed depth, or to provide two layers of particulates each performing a different function. Distribution of particulate matter within the web depends to some extent on the denier of the fibers used and the size and density of the particulate matter chosen.

FIG. 8 represents in highly schematic form the formation of a fabric structure 32 as is illustrated in FIG. 2. Carding machine 78 forms an open web 34 of composite thermoplastic fibers 40, such as sheath-core staple fibers 60, that are deposited on endless moving belt 72. Web 34 is contacted under light pressure with a calendar roll 80 to partially densify web 34. Web 34 should be densified only to the extent that numerous individual fibers still remain extending from the surfaces thereof for intermingling with the fibers of web 24.

Another carding machine 70 deposits an open web 24 of composite thermoplastic fibers 22 onto partially densified web 34. Fibers 22 may be the same or different as fibers 40 in the partially densified web, and the fibers of the two webs become substantially intermingled at the interface 36 of the webs. Fibers 22 may be sheath-core staple as shown in FIG. 4. Particulate matter is applied in the same manner as is shown in FIG. 7. Heat, preferably infrared heat is applied as shown in FIG. 7. The heat applied also bonds the intermingled fibers 40 of the partially bonded web 34 to the fibers 22 of the open web 24 such that the webs form a unitary structure 32 and delamination at the interface of the two webs is substantially precluded. If desired, fibrous structure 32 may be further bonded by the application of pressure by running the structure through a calendar nip (not shown).

FIG. 9 represents in highly schematic form the preparation of a fibrous structure 42 similar to that illustrated in FIG. 3. The formation of webs 34 and deposition of web 24 thereon with particulate matter is the same as for FIG. 8. However, prior to thermally bonding the structure, another carding machine 82 deposits a carded web of composite fibers 46 onto open web 24. Web 46 may comprise the same or different fibers as webs 24 or 34. For example, web 46 may comprise sheath-core fibers 60 having a lower melting nylon sheath and a higher melting polyester core as are represented in FIG. 4.

Particulate matter 48 is distributed into the web 46 from a shaker 84. Particulate matter 48 may be the same as particulate matter 30 of web 24 if it is desired to provide more particulate matter surface area and greater depth of particulate matter within the structure. Also contemplated within the practice of the invention is that different particulates can be incorporated into the webs to provide a multifunctional fibrous structure. For example, particulate matter 30 may comprise activated carbon beads for the selective adsorption of gases. Particulate matter 48 may comprise a biocide. Together, these components in the structure 42 provide a defense fabric that may be suitable for use in protecting military personnel from poison gas and bacteriological warfare tactics.

Also shown in FIG. 9, a fourth layer 52 may be applied to the structure 42. Layer 52 is shown being applied from a roll 86 to the surface of web 46. Layer 52 may comprise a partially densified web of fibers or a fabric of thermoplastic manufactured fibers. It should be noted that rolling a partially densified web onto a reel has the effect of further densifying the web. The entire structure 42 is subjected to heat from a heater 88, preferably infrared heat, to bond layer 52 to the structure. Finally, if desired, the entire structure 42 may be passed through a calendar nip 90 to further bond the structure.

The web for the fabric structure of the invention may be dry formed using carding machines as illustrated above. Alternatively, the web may be formed by air laying staple fibers, either crimped or not, spin bonding of continuous filaments, or wet forming, typically of non-crimped staple. Any method that produces a web having the particulate matter distributed into the interior thereof and not on the surface is suitable for practice of the invention. In each of the methods mentioned above, an underlayer or overlayer of a carded web, preformed fiber web, fabric, or membrane may be applied.

FIG. 10 represents in a highly schematic form the method of wet forming a fibrous structure 91 (FIG. 11) having fabric layers bonded thereto. FIG. 11 represents a greatly enlarged sectional view of the fibrous structure of FIG. 10. A triple headbox, represented broadly at 92, should be used to create a fibrous structure having particulate matter distributed on the interior thereof and not extending into the surfaces. First headbox 94 deposits an aqueous suspension of thermoplastic manufactured fibers 95 (FIG. 11) onto an endless foraminous forming wire 96. Vacuum is applied through the forming wire to remove a portion of the liquid and form a web and has the effect of partially densifying the web. Second headbox 100 deposits an aqueous suspension of composite thermoplastic fibers 101 and particulate matter 102 (FIG. 11) onto the web from the first headbox. These fibers should have a lower melting component and a higher melting component, such as, for example, fibers 60 illustrated in FIG. 4. Vacuum continues to be applied through the forming wire to remove the aqueous component of the suspension. Third headbox 103 supplies an aqueous suspension of thermoplastic fibers 104 (FIG. 11) and deposits this suspension onto the web formed from the second headbox. The fibers supplied from the first and third headboxes 94 and 103, respectively, may be the same or different from the fibers 101 deposited from the second headbox 100.

One of the benefits of wet forming the fabric structure of the invention from a triple headbox as shown at 92 is that the fibers of the webs from each of the headboxes become well intermingled as the aqueous component is removed under vacuum through the forming wire. The triple headbox wet forming process results in a fabric structure that is unitary and not substantially subject to delamination of the particulate containing layers.

Also as shown in FIG. 10, fabrics 105 and 106, which comprise manufactured fibers, may be applied to each side of the fabric structure from rolls 108 and 110, respectively. Heat is supplied from heater 112, preferably infrared heat, to thermally bond the web structure, entrapping the particulate matter in the structure, and to fuse the particulate matter to the individual fibers in the structure. Through-air heat is supplied from heater 114 to complete drying of the structure.

While the invention has been described with reference to specific preferred embodiments, it should be understood that the invention is not intended to be limited to the embodiments illustrated in the drawings. On the contrary, the invention includes all alternatives, modifications, and equivalents that may be included within the scope and spirit of the invention as defined by the appended claims.

That which is claimed is:

1. A process for making a fibrous structure comprising the steps of:
    (a) dry forming an open fibrous web structure comprising crimped staple composite fibers having a denier of from about 1 dpf to about 6 dpf and comprising a structural component and a lower melting component;
    (b) thereafter by gravity, distributing and entrapping in three dimensions, sorptive particles of suitable size, shape and weight within interiorly located spaces of said web structure; and
    (c) thereafter applying heat without pressure to said web structure to further secure the entrapped sorptive particles by melt adhesion to said composite fibers, and to simultaneously effect thermal bonding of said composite fibers, said heat without pressure being the initial application of heat to said web structure.

2. The process of claim 1, further comprising the step of depositing an additional fibrous structure on said web structure prior to said heating step.

3. The process of claim 1, wherein said web structure is dry-formed on a partially densified web whereby said heating forms a unitary structure of said partially densified web and said web structure.

4. The process of claim 3, wherein said partially densified web comprises composite fibers comprising a structural component and a lower melting component.

5. The process of claim 3, further comprising prior to said heating step, depositing an additional fibrous structure on said web structure opposite to said partially densified web.

6. The process of claim 5, further comprising prior to said heating step, depositing a second partially densified web on said additional fibrous structure.

7. The process of claim 1, further comprising forming additional fibrous structures containing particulate matter on said web structure, whereby a unitary structure is obtained.

8. The process of claim 1, further comprising the step of laminating a layer to said web structure.

9. The process of claim 8, wherein said layer is a fabric layer selected from knit, woven and nonwoven fabrics.

10. The process of claim 1, wherein said lower melting component differs in melting point from said structural component by at least about 20° C.

11. The process of claim 1, wherein said dry-forming process is selected from carding, spun bonding and air-laying.

12. The process of claim 1, wherein said sorptive particles are activated carbon particles.

13. A process for making a fibrous structure comprising the steps of:
    (a) dry forming an open fibrous web structure comprising crimped staple composite fibers having a denier of from about 1 dpf to about 6 dpf and comprising a structural component and a lower melting component;
    (b) thereafter by gravity, distributing and entrapping in three dimensions, functional particles of suitable size, shape and weight within interiorly located spaces of said web structure, said functional particles having a lower specific heat than said lower melting fiber component; and
    (c) thereafter applying infrared heat to said web structure to further secure the entrapped functional particles by melt adhesion to said composite fibers, and to simultaneously effect thermal bonding of said composite fibers, said infrared heat being the initial application of heat to said web structure.

14. The process of claim 13, wherein said functional particles are activated carbon particles.

* * * * *